(12) United States Patent
Suga et al.

(10) Patent No.: US 6,887,443 B2
(45) Date of Patent: May 3, 2005

(54) EXHAUST GAS PURIFYING CATALYST AND METHOD FOR PURIFYING EXHAUST GAS

(75) Inventors: Katsuo Suga, Kanagawa-ken (JP); Hironori Wakamatsu, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/315,058

(22) Filed: Dec. 10, 2002

(65) Prior Publication Data

US 2003/0147796 A1 Aug. 7, 2003

(30) Foreign Application Priority Data

Dec. 27, 2001 (JP) ........................................ 2001-397387

(51) Int. Cl.⁷ ..................... B01J 23/42; B01J 23/44; B01J 23/46
(52) U.S. Cl. ................. 423/239.1; 423/213.5; 423/213.7; 423/247; 502/325; 502/328; 502/330; 502/339; 502/340; 502/344; 422/169; 422/170; 422/177; 422/180
(58) Field of Search ................... 502/325, 328, 502/330, 339, 340, 344; 422/169, 170, 177, 180; 423/239.1, 213.5, 213.7, 247

(56) References Cited

U.S. PATENT DOCUMENTS

| | | | | |
|---|---|---|---|---|
| 4,806,519 A | * | 2/1989 | Chiba et al. | 502/252 |
| 5,459,119 A | * | 10/1995 | Abe et al. | 502/326 |
| 5,753,580 A | * | 5/1998 | Hayashi et al. | 502/304 |
| 6,047,544 A | * | 4/2000 | Yamamoto et al. | 60/285 |
| 6,217,831 B1 | * | 4/2001 | Suzuki et al. | 422/177 |
| 6,375,910 B1 | * | 4/2002 | Deeba et al. | 423/239.1 |
| 6,413,483 B1 | * | 7/2002 | Brisley et al. | 423/239.1 |
| 6,497,848 B1 | * | 12/2002 | Deeba et al. | 422/180 |
| 6,518,213 B1 | * | 2/2003 | Yamamoto et al. | 502/65 |
| 6,617,276 B1 | * | 9/2003 | Ballinger et al. | 502/66 |
| 6,677,264 B1 | * | 1/2004 | Klein et al. | 502/74 |
| 6,777,370 B2 | * | 8/2004 | Chen | 502/241 |
| 2002/0048542 A1 | * | 4/2002 | Deeba et al. | 423/239.1 |
| 2002/0192128 A1 | * | 12/2002 | Nakamura et al. | 422/177 |
| 2003/0153453 A1 | * | 8/2003 | Kasahara et al. | 502/64 |

FOREIGN PATENT DOCUMENTS

| | | | |
|---|---|---|---|
| EP | 1 066 874 | * | 1/2001 |
| EP | 1 121 981 | * | 8/2004 |
| JP | 5-168860 A | | 7/1993 |

* cited by examiner

Primary Examiner—Christina Johnson
(74) Attorney, Agent, or Firm—Foley & Lardner LLP

(57) ABSTRACT

An exhaust gas purifying catalyst comprises a catalytic ingredient including rhodium, at least one of platinum and palladium, at least one of absorption materials for absorbing NOx, a porous carrier, and a monolithic support for supporting the catalytic ingredient. The exhaust gas purifying catalyst includes a plurality of catalytic layers containing at least a part of the catalytic ingredient, and rhodium is contained at least in an outermost layer of the catalytic layers. A rhodium amount in the catalytic ingredient is 0.5 g or more for each liter of the catalyst, and a rhodium amount contained in the outermost layer accounts for 80 wt % or more of a total rhodium amount. A weight of the catalytic layer at the outermost layer is 40 wt % or below of a total weight of the catalytic layers.

8 Claims, 2 Drawing Sheets

EXHAUST GAS PURIFYING CATALYST AND METHOD FOR PURIFYING EXHAUST GAS

BACKGROUND OF THE INVENTION

1. Field of the Invention

The present invention relates to an exhaust gas purifying catalyst for purifying hydrocarbons (HC), carbon monoxide (CO), and nitrogen oxides (NOx) contained in exhaust gas discharged from internal combustion engines for automobiles (mainly diesel-driven), boilers and the like, and a method for purifying exhaust gas using the foregoing. The present invention is particularly focused on NOx purification in an oxygen-excessive region.

2. Description of the Related Art

In recent years, there has been a large demand for low-fuel-consumption automobiles in view of the problems of the exhaustion of petroleum resources and global warming, and development of lean-burn automobiles has drawn attention. In lean-burn automobiles, exhaust gas atmosphere in a lean-burn driving mode becomes oxygen-excessive atmosphere (lean) as compared to a state of a theoretical air-fuel ratio. However, if a usual three-way catalyst is used in such a lean region, there has been a problem of an insufficient NOx purifying operation affected by excessive oxygen. Accordingly, the development of a catalyst capable of purifying NOx even in oxygen-excessive conditions has been long awaited.

In this context, various catalysts for purifying NOx in the lean region have been proposed heretofore. For example, there is proposed a catalyst which stores NOx in a lean region and purifies NOx by discharging NOx in a stoichiometric or rich condition, as represented by a catalyst loading platinum (Pt) and lanthanum (La) on a porous carrier thereof (Japanese Patent Application Laid-Open No. 5-168860 (1993)).

SUMMARY OF THE INVENTION

Nevertheless, there has been a problem that NOx purifying properties are insufficient even if the above-described conventional catalysts are used. Moreover, in a conventional reaction for reducing NOx, which is absorbed when the exhaust gas atmosphere is in a lean condition, to $N_2$ in the stoichiometric or rich condition, CO contained in reducing gas is absorbed onto platinum or palladium and thereby poisons such noble metals as the temperature of the exhaust gas drops. Accordingly, there has been a problem of the inhibition of the reductive reaction to $N_2$.

The present invention has been made in consideration of the above problems. It is an object of the present invention to provide an exhaust gas purifying catalyst having excellent NOx purifying properties, more particularly excellent NOx absorbing properties in a lean region, and a method for purifying exhaust gas. Another object of the present invention is to provide an exhaust gas purifying catalyst having excellent resistance properties to CO poisoning.

The first aspect of the present invention provides an exhaust gas purifying catalyst for absorbing NOx in a lean condition and reducing NOx to $N_2$ in a stoichiometric condition and a rich condition, comprising: a catalytic ingredient comprising rhodium, at least one of platinum and palladium, at least one of absorption materials for absorbing NOx, the absorption materials being selected from the group consisting of Mg, Ca, Sr, Ba, Na, K and Cs, and a porous carrier; and a monolithic support for supporting the catalytic ingredient, wherein the exhaust gas purifying catalyst includes a plurality of catalytic layers containing at least a part of the catalytic ingredient, and rhodium is contained at least in an outermost layer of the catalytic layers, a rhodium amount in the catalytic ingredient is 0.5 g or more for each liter of the catalyst, and a rhodium amount contained in the outermost layer accounts for 80 wt % or more of a total rhodium amount, and a weight of the catalytic layer at the outermost layer accounts for 40 wt % or below of a total weight of the catalytic layers.

The second aspect of the present invention provides a method for purifying exhaust gas, comprising: preparing an exhaust gas purifying catalyst for absorbing NOx in a lean condition and reducing NOx to $N_2$ in a stoichiometric condition and a rich condition, the exhaust gas catalyst, comprising: a catalytic ingredient comprising rhodium, at least one of platinum and palladium, at least one of absorption materials for absorbing NOx, the absorption materials being selected from the group consisting of Mg, Ca, Sr, Ba, Na, K and Cs, and a porous carrier; and a monolithic support for supporting the catalytic ingredient, wherein the exhaust gas purifying catalyst includes a plurality of catalytic layers containing at least a part of the catalytic ingredient, and rhodium is contained at least in an outermost layer of the catalytic layers, a rhodium amount in the catalytic ingredient is 0.5 g or more for each liter of the catalyst, and a rhodium amount contained in the outermost layer accounts for 80 wt % or more of a total rhodium amount, and a weight of the catalytic layer at the outermost layer accounts for 40 wt % or below of a total weight of the catalytic layers, wherein a temperature range at an inlet of the catalyst in the lean condition of the exhaust gas covers 200° C.

BRIEF DESCRIPTION OF THE DRAWINGS

The invention will now be described with reference to the accompany drawings wherein.

DETAILED DESCRIPTION OF THE PREFERED EMBODIMENT

Figure 1:
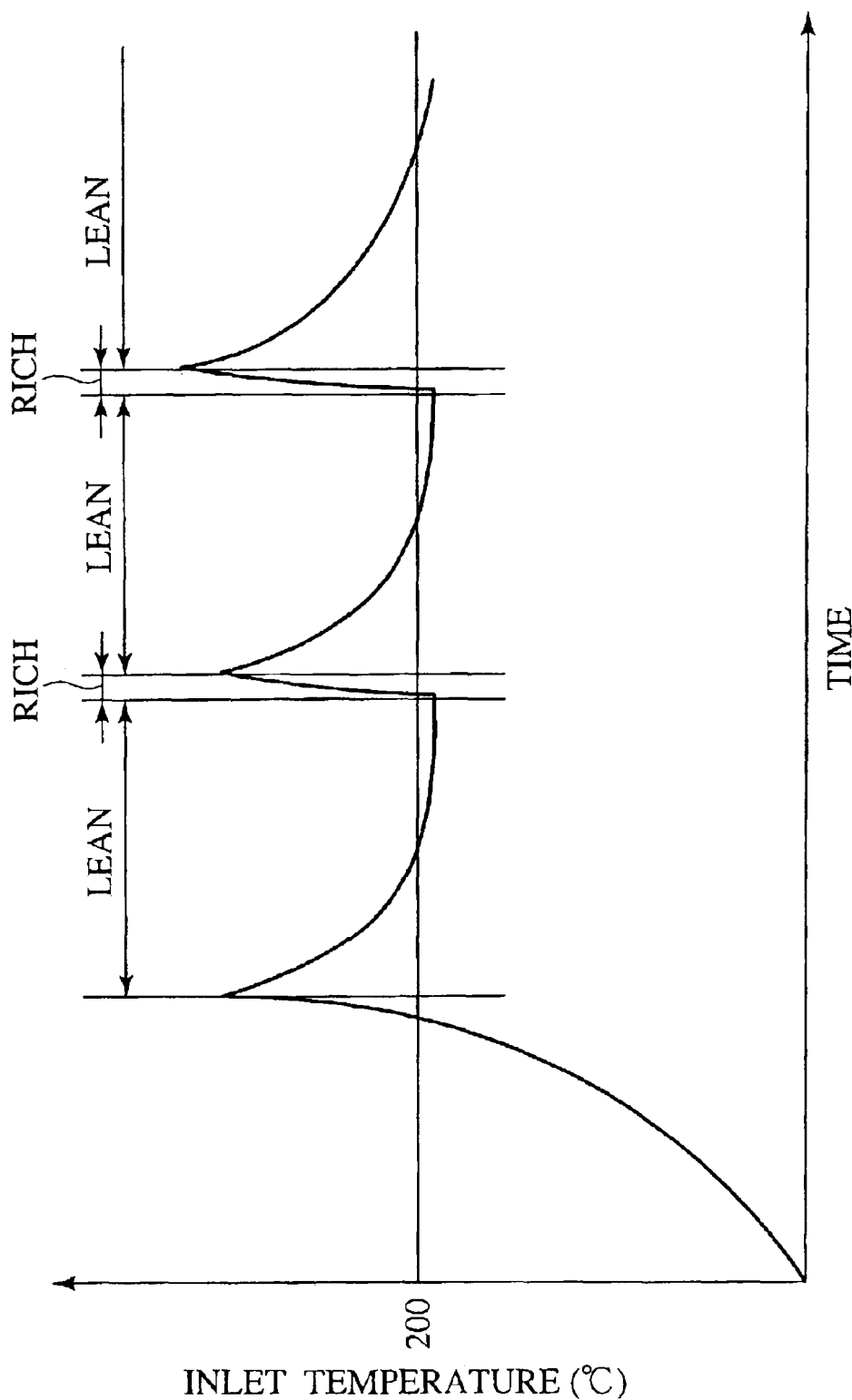
FIG. 1 is a view showing an example of a relationship between the temperature of the inlet of the catalyst and running time.

Hereinafter, description will be made of embodiments of the present invention with reference to the drawings.

As described above, an exhaust gas purifying catalyst of the present invention is constituted by a catalytic ingredient including rhodium (Rh), other noble metals, certain alkali metals or alkaline-earth metals, and a porous carrier, and the catalytic ingredient is supported on a monolithic support (a honeycomb support).

Moreover, supporting the catalytic ingredient on the monolithic support is carried out by forming a plurality of catalytic layers on the monolithic support, in which the catalytic layer includes all or part of the catalytic ingredient. In the present invention, it is essential that the outermost layer of the catalytic layers, i.e. the catalytic layer to be exposed directly to the exhaust gas, includes at least rhodium.

The other noble metals include platinum (Pt) and palladium (Pd). Such a noble metal is effective when the catalyst of the present invention functions as a three-way catalyst in the stoichiometric condition. Here, it is preferable that platinum and palladium are loaded in an inner layer or layers other than the outermost layer, and therefore are not exposed directly to the exhaust gas.

Moreover, alkali metals and alkaline-earth metals, as absorption materials, include sodium (Na), potassium (K), cesium (Cs), magnesium (Mg), calcium (Ca), strontium (Sr), and barium (Ba). Furthermore, it is also possible to mix the alkali metal and the alkaline-earth metal arbitrarily for use therein. Note that Mg, Ca and Ba are preferred among the alkali metals and the alkaline-earth metals, and Mg is most preferable.

In the exhaust gas purifying catalyst of the present invention, it is essential to set an Rh amount to 0.5 g or more for 1 liter of the catalyst. As described above, in a reaction for reducing NOx to $N_2$ in the stoichiometric or rich condition, in which NOx is absorbed when the exhaust gas atmosphere is in the lean condition, CO contained in reducing (as is conventionally absorbed onto platinum or palladium. Thereby CO poisons such noble metals as the temperature of the exhaust gas drops. Accordingly, there has been a problem of the inhibition of the reductive reaction to $N_2$.

As a result of extensive studies, the inventors of the present invention have found out that Rh has a function of purifying CO in a stoichiometric or rich condition. Moreover, the inventors have found out that functions of purifying and removing CO are enhanced considerably when Rh of 0.5 g or more is contained for 1 liter of the catalyst. The present invention is based on this knowledge. Note that, however, there may be a case where the functions of purifying and removing CO are not improved considerably if Rh is contained at more than 3 g/L. In addition, noble metals, especially Rh, are expensive and low-yield. Therefore, it is necessary to use Rh in smaller quantities. From this point, it is preferable that the Rh amount contained is set in a range from 0.5 to 3 g/L. In the catalyst according to the present invention, it is essential that a Rh amount to be contained in the outermost layer accounts for 80 wt % or more of a total Rh amount contained in the catalyst. Since Rh reduces CO poisoning in a stoichiometric or rich condition as mentioned above, CO poisoning on Pt or Pd contained in the inner layers disposed inside the outermost layer can be effectively reduced if the Rh amount contained in the outermost layer is increased by a certain degree. In order to reduce CO poisoning most efficiently, it is preferable that Rh should exist in the outermost layer as much as possible. Accordingly, it is most preferable that the Rh amount contained in the outermost layer accounts for 100 wt %.

Furthermore, in the present invention, it is essential that a weight of the outermost coating layer does not exceed 40 wt % of the total weight of the catalytic layers. CO reduction by Rh contained in the outermost layer is performed more efficiently when an Rh density is set relatively higher. Accordingly, it is possible to achieve a preferable Rh density by setting the weight of the outermost layer to the above-described proportion in order to develop an effect intended in the present invention. Note that, however, if the weight of the outermost coating layer is set too small, the effect of supporting the noble metal, which exists in the outermost layer, is reduced. Therefore, conditions occur in which the noble metal is easily deteriorated. For this reason, it is most preferable that the weight of the coating layer as the outermost layer is set in a range from 30 to 40 wt % of the total weight of the catalyst layer.

Here, when both Pt and Pd are contained in the catalyst of the present invention, it is preferable that a proportion of Rh content to a total amount of Rh, Pt and Pd is adjusted in accordance with the following formula (1) on a mass standard:

$$\{(Rh \text{ amount})/(Rh \text{ amount} + Pt \text{ amount} + Pd \text{ amount})\} \times 100 = 20 \text{ (wt \%)} \quad (1)$$

If the proportion of Rh content is below 20 wt %, then the major part of Pt and Pd may suffer from CO poisoning. Thus, there may be a case that a purifying function corresponding to an added amount of the noble metal is not obtained sufficiently.

Meanwhile, the given porous carrier includes alumina, ceria, titania, zirconia and the like. However, aluminum is most preferable. Alumina is effective in retaining the noble metal, the alkaline-earth metal or the like in a state of high specific surface. Here, it is preferable that alumina has high heat resistance.

Moreover, additives such as rare earth elements of cerium (Ce), lanthanum (La) and the like can be also added for the purpose of enhancing the heat resistance of alumina, as have been applied conventionally to three-way catalysts. Furthermore, it is also possible to add materials used for intensifying the function as the three-way catalyst. For example, it is also possible to add ceria having an oxygen storage function, barium for relieving noble metal from poisoning by HC absorption, zirconia for contributing enhancement in heat resistance of Rh, titania for enhancing resistance to sulfur poisoning, and the like.

Still further, the catalyst of the present invention may contain impurities contained in constituent elements as long as amounts of such impurities are sufficiently small not to interfere with operations of the constituent elements. For example, strontium contained in barium, lanthanum contained in cerium, neodymium and samarium, hafnium and sulfur contained in zirconium may be contained therein when those amounts are small.

Although the monolithic support (the honeycomb support) is used for the catalyst of the present invention, it is also possible to use other supports of integrated types. It is known that the monolithic support is typically made of a heat-resistive material, and a monolithic support made of ceramics such as cordierite or a monolithic support made of metal such as ferrite-based stainless steel is used therein.

An air-fuel ratio of the exhaust gas purifying catalyst of the present invention repeats a cycle composed of a lean region, a stoichiometric region and a rich region, whereby the exhaust gas purifying catalyst exerts a high NOx purifying operation. It is preferable that the range of the air-fuel ratio is set in a range from 10 to 14.7 in the stoichiometric region to the rich region, and that the air-fuel ratio is set in a range from 1.8 to 50 in the lean region. If the air-fuel ratio is below 10 in the rich region, the deterioration of activity may be incurred owing to excessive reducing gas (HC and CO) covering the noble metal in the catalyst. On the contrary, if the air-fuel ratio exceeds 14.7 in the stoichiometric region, there may be a case where operations for eliminating and purifying NOx are not obtained sufficiently because of a shortage of the reducing gas. Meanwhile, if the air-fuel ratio in the lean region is below 18, there may be a case where an operation of absorbing NOx becomes insufficient due to shortage of oxygen required for NOx absorption. Moreover, if the air-fuel ratio exceeds 50 in the lean region, there may be also a case where the operation of absorbing NOx is not obtained properly because an oxygen amount required for NOx absorption is already saturated.

Upon using the catalyst of the present invention, it is preferable that a temperature range at an inlet of the catalyst in the lean condition at least covers 200° C. A poisoning operation by CO becomes significant when a temperature of the exhaust gas is low, particularly when the temperature falls below 200° C. or thereabout. On the contrary, the catalyst of the present invention exerts a significant effect if used under a condition of setting the temperature of the inlet of the catalyst at 200° C. or thereabout in the lean condition.

As described above, a direct injection engine, a lean-burn engine, and a diesel engine mostly run in the lean condition. However, in order to reduce the absorbed NOx to $N_2$, it is essential for those engines to be in the rich state temporarily. FIG. 1 shows an example of a relationship between the temperature of the inlet of the catalyst and running time. Here, FIG. 1 shows one example of the patterns of the temperature of the inlet, and the rich/lean control and control of the temperature of the inlet is not limited to this pattern. As shown in FIG. 1, a large amount of fuel is supplied to the engine to promote combustion in the rich condition. Accordingly, the temperature of the exhaust gas from the engine increases temporarily. On the contrary, since the supply of the fuel amount decreases in the lean condition, the temperature of an exhaust (a gas from the engine decreases. The present invention shows a significant effect by setting the temperature range at the inlet to cover 200° C. in the lean condition. To secure the temperature of 200° C. at the inlet, the catalyst of the present invention is effectively used, mostly in the diesel engine. However, this does not prevent the catalyst of the present invention from being used in other internal combustion engines (gasoline engines, boilers and the like).

Next, description will be made regarding an exhaust gas purifying system of the present invention.

An exhaust gas purifying system of the present invention is a system including the above-described exhaust gas purifying catalyst of the present invention. The exhaust gas purifying system has a constitution whereby a catalyst for reducing CO in a stoichiometric or rich condition of exhaust gas is disposed upstream in an exhaust gas passage of the exhaust gas purifying catalyst. The reason for disposing such a CO reduction catalyst is to supplement the exhaust gas purifying catalyst of the present invention. In that condition, although the exhaust gas purifying catalyst of the present invention has an effect of reducing CO poisoning, the exhaust gas purifying catalyst may not be able to exert its operation sufficiently if there is an excessive amount of CO flowing therein. Although the CO amount in the stoichiometric or rich condition is not particularly limited, it is preferable that the CO amount is typically set in a range from 0.5 to 3.0 wt %.

It is preferable that the CO reduction catalyst should include platinum, palladium, rhodium and an arbitrary mixture thereof. Inclusion of such noble metals effectuates the efficient reduction of CO in the stoichiometric or rich condition. Accordingly, it is possible to easily obtain the effect in accordance with the object of the present invention.

Here, the environment for using the exhaust gas purifying system of the present invention is similar to the environment for using the exhaust gas purifying catalyst described previously. Particularly, it is similarly preferred that a temperature range at an inlet of the exhaust gas purifying catalyst in the lean condition covers 200° C.

Now, the present invention will be described further in detail with reference to examples and comparative examples. However, it is to be noted that the present invention will not be limited to the examples herein.

EXAMPLE 1

Figure 2:
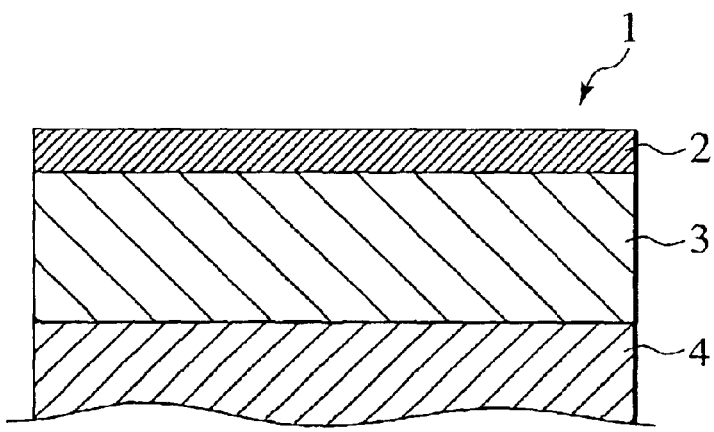
FIG. 2 is a substantial cross-sectional view showing an exhaust gas purifying catalyst of example of the present invention.

FIG. 2 shows a cross-sectional view of a principal part of an exhaust gas purifying catalyst of this example. As a method for preparing an inner layer 3, activated alumina powder is first impregnated and agitated in a dinitrodiammineplatinum aqueous solution, and then the mixture thereof is dried out. The dried powder is baked at 400° C. for 1 hour in the air, whereby Pt-loaded alumina powder is obtained. The Pt-loaded alumina powder, activated alumina powder, boehmite, water and nitric acid are blended and put in a magnetic ball mill, whereby first slurry is obtained after mixing and crushing. The first slurry is adhered to a cordierite monolithic support 4 (1.3 liter and 400 cells), and the redundant slurry in the cells is removed by airflow. Thereafter, the monolithic support is dried at 130° C. and then baked at 400° C. for 1 hour to prepare the inner layer 3.

Moreover, regarding a method for preparing a surface layer 2, activated alumina powder is impregnated and agitated in a rhodium nitrate aqueous solution, and then the mixture thereof is dried out. The dried powder is baked at 400° C. for 1 hour in the air, whereby Rh-loaded alumina powder is obtained. The Rh-loaded alumina powder, activated alumina powder, boehmite, water and nitric acid are blended and put in similarly in the above-described method, and thereby second slurry is obtained. The second slurry is adhered to the above-described catalyst loading the inner layer, and subjected to drying and then baking. Accordingly, the surface layer 2 can be obtained.

Subsequently, the catalyst supporting the above-described coating layers is impregnated into a barium acetate aqueous solution, and the redundant barium acetate aqueous solution is removed by airflow. The catalyst is dried out at 130° C. and then baked at 400° C. for 1 hour, whereby an exhaust gas purifying catalyst 1 of this example is obtained. A barium amount thereof is 30 g/L in terms of oxides.

The Rh content of the catalyst 1 is 0.7 g for each liter of the catalyst. The Pt content thereof is 2.0 g for each liter of the catalyst. The Rh content of the outermost layer is 100 wt % of total Rh. The weight of the coating layer at the surface layer 2 is 100 g/L, and the weight of the coating layer at the inner layer 3 is 200 g/L. In the catalyst 1 obtained according to the above-described method, Rh is loaded on the surface layer 2, Pt is loaded on the inner layer 3, and Ba is loaded on both of the surface latter 2 and the inner layer 3.

COMPARATIVE EXAMPLE 1

A catalyst of this example is obtained by repeating the processes similar to Example 1, except that the Rh amount is set to 0.2 g for each liter of the catalyst and the Pt amount is set to 2.5 g for each liter of the catalyst.

COMPARATIVE EXAMPLE 2

A catalyst of this example is obtained by repeating the processes similar to Example I, except that the Rh content of the surface layer is set to 50 wt % of total Rh.

COMPARATIVE EXAMPLE 3

A catalyst of this example is obtained by repeating the processes similar to Example 1, except that the weight of the coating layer at the surface layer is set to 200 g/L and the weight of the coating layer at the inner layer is set to 100 g/L.

EXAMPLE 2

A catalyst of this example is obtained by repeating the processes similar to Example 1, except that the Rh amount is set to 1.0 g/L and the Pt amount is set to 1.7 g/L.

EXAMPLE 3

A catalyst of this example is obtained by repeating the processes similar to Example 1, except that part of Pt is substituted by Pd. The Pd amount thereof is 0.5 g/L and the Pt amount thereof is 1.5 g/L.

EXAMPLE 4

This example refers to an exhaust gas purifying system including a CO reduction catalyst and the exhaust gas purifying catalyst of Example 1. The CO reduction catalyst is prepared as described below. Activated alumina powder is impregnated and agitated in a palladium nitrate aqueous solution, and then the mixture thereof is dried out. The dried powder is baked at 400° C. for 1 hour in the air, whereby Pd-loaded alumina powder is obtained. Meanwhile, activated alumina powder is impregnated and agitated in a rhodium nitrate aqueous solution, and then the mixture thereof is dried out. The dried powder is baked at 400° C. for 1 hour in the air, whereby Rh-loaded alumina powder is obtained.

The Pt-loaded alumina powder, the Rh-loaded alumina powder, activated alumina powder, boehmite, water and nitric acid were blended and put in a magnetic ball mill, whereby slurry is obtained after mixing and crushing. The slurry is adhered to a cordierite monolithic support (0.7 liter and 400 cells), and the redundant slurry in the cells is removed by airflow. Thereafter, the monolithic support is dried at 130° C. and then baked at 400° C. for 1 hour to prepare a catalyst layer. Note that the CO reduction catalyst of this example consists of one coating layer.

The Rh content of the CO reduction catalyst is 0.7 g for each liter of catalyst, the Pd content thereof is 2.0 g for each liter of catalyst, and the weight of the coating layer is 200 g/L.

Figure 3:
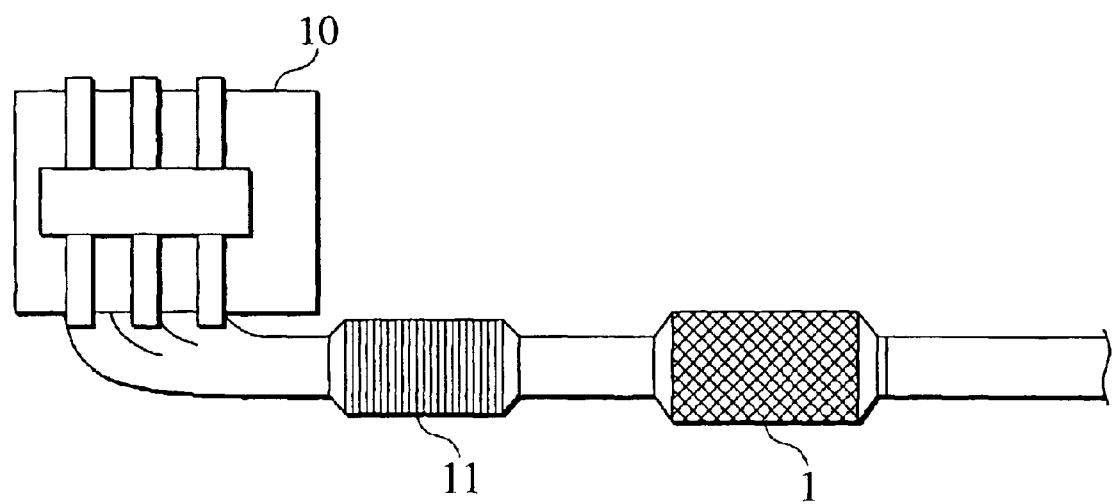
FIG. 3 is a schematic view showing an exhaust gas purifying system of example of the present invention.

The CO reduction catalyst is disposed at a precedent stage to the catalyst of Example 1 (on an upstream side in an exhaust gas passage), and the exhaust gas purifying system of this example is thereby constructed. FIG. 3 shows a schematic view of this example. Reference numeral 10 denotes an engine, and the exhaust gas purifying system has a constitution of disposing the CO reduction catalyst 11 of this example at the precedent stage to the exhaust gas purifying catalyst 1 of Example 1.

Catalytic ingredients of the respective examples thus obtained are shown in Table 1.

(Evaluation of Performances)

The catalysts and the exhaust gas purifying system severally obtained in the above-described examples are evaluated under the following condition. The obtained results are shown in Table 2.

(Method of Durability Test)

Each of the catalysts is fitted to an exhaust system of an engine having a displacement of 4,400 cubic centimeters (cc). The temperature at an inlet of each catalyst (a temperature at an inlet of the exhaust gas purifying catalyst 1 in the case of Example 4) is set to 600° C. or thereabout, and the engine is put into operation for 50 hours.

(Method of Evaluation)

Each of the catalysts is fitted to an exhaust system of an engine having a displacement of 2,200 cubic centimeters (cc), and an operation in a series of A/F=14.6 for 5 seconds, A/F=11.0 for 2 seconds and A/F=22.0 for 20 seconds, is iterated. The temperature at the inlet of each catalyst (the temperature at the inlet of the exhaust gas purifying catalyst 1 in the case of Example 4) covers 200° C. A total conversion ratio for one cycle of the above-described switching operation is determined.

TABLE 2

| | Total conversion ratio (%) | | |
|---|---|---|---|
| | HC | CO | NOx |
| Example 1 | 90 | 98 | 75 |
| Comparative example 1 | 88 | 98 | 62 |
| Comparative example 2 | 90 | 98 | 69 |
| Comparative example 3 | 90 | 98 | 69 |
| Example 2 | 90 | 98 | 85 |
| Example 3 | 94 | 99 | 73 |
| Example 4 | 95 | 99 | 90 |

As described above, according to the present invention, rhodium is used as a catalytic ingredient, and the loading position, the content and the like of rhodium are appropriately adjusted. Accordingly, it is possible to provide an exhaust gas purifying catalyst, and a method for purifying exhaust gas with excellent NOx purifying properties, particularly, excellent NOx purifying properties in a lean region.

The entire content of a Japanese Patent Application No. P2001-397387 with a filing date of Dec. 27, 2001 is herein incorporated by reference.

Although the invention has been described above by reference to certain embodiments of the invention, the

TABLE 1

| | Catalytic ingredient (g/L) | | | | Surface layer Rh (wt %) | Weight of coating layer at surface layer (wt %) | Rh/total noble metal (wt %) |
|---|---|---|---|---|---|---|---|
| | Pt | Pd | Rh | Ba | | | |
| Example 1 | 2.0 | | 0.7 | 30 | 100 | 33 | 26 |
| Comparative example 1 | 2.5 | | 0.2 | 30 | 100 | 33 | 7 |
| Comparative example 2 | 2.0 | | 0.7 | 30 | 50 | 33 | 26 |
| Comparative example 3 | 2.0 | | 0.7 | 30 | 100 | 66 | 26 |
| Example 2 | 1.7 | | 1.0 | 30 | 100 | 33 | 37 |
| Example 3 | 1.5 | 0.5 | 0.7 | 30 | 100 | 33 | 26 |
| Example 4 (CO reduction catalyst only) | | 2.0 | 0.7 | — | — | — | 26 |

What is claimed is:

1. A method for purifying exhaust gas with an exhaust gas purifying catalyst, comprising:

contacting an exhaust gas from a diesel engine with a carbon monoxide reduction catalyst positioned upstream of the exhaust gas purifying catalyst; and contacting the exhaust gas with an exhaust gas purifying catalyst for absorbing NOx in a lean condition and reducing NOx to $N_2$ in a stoichiometric condition and a rich condition, the exhaust gas catalyst, comprising:

a catalytic ingredient comprising rhodium, at least one of platinum and palladium, at least one of absorption materials for absorbing NOx, the absorption materials being selected from the group consisting of Mg, Ca, Sr, Ba, Na, K and Cs, and a porous carrier; and a monolithic support for supporting the catalytic ingredient, wherein the exhaust gas purifying catalyst includes a plurality of catalytic layers containing at least a part of the catalytic ingredient, and rhodium is contained at least in an outermost layer of the catalytic layers, a rhodium amount in the catalytic ingredient is 0.5 g or more for each liter of the catalyst, and a rhodium amount contained in the outermost layer accounts for 80 wt % or more of a total rhodium amount, and a weight of the catalytic layer at the outermost layer accounts for 40 wt % or below of a total weight of the catalytic layers, wherein the exhaust gas is maintained at a temperature at an inlet of the exhaust gas purifying catalyst in the lean condition of at least about 200° C.

2. An exhaust gas purifying system, comprising:

a diesel engine having an exhaust gas system;

an exhaust gas purifying catalyst for absorbing NOx in a lean condition and reducing NOx to $N_2$ in a stoichiometric condition and a rich condition, the exhaust gas purifying catalyst being located in the exhaust gas system and comprising:

a catalytic ingredient comprising rhodium, at least one of platinum and palladium, at least one of absorption materials for absorbing NOx, the absorption materials being selected from the group consisting of Mg, Ca, Sr, Ba, Na, K and Cs, and a porous carrier; and a monolithic support for supporting the catalytic ingredient; and a carbon monoxide reduction catalyst positioned in the exhaust gas system upstream of the exhaust gas purifying catalyst, wherein the exhaust gas purifying catalyst includes a plurality of catalytic layers containing at least a part of the catalytic ingredient, and rhodium is contained at least in an outermost layer of the catalytic layers, a rhodium amount in the catalytic ingredient is 0.5 g or more for each liter of the catalyst, and a rhodium amount contained in the outermost layer accounts for 80 wt % or more of a total rhodium amount, and a weight of the catalytic layer at the outermost layer accounts for 40 wt % or below of a total weight of the catalytic layers.

3. The exhaust gas purifying system of claim 2, wherein the catalytic ingredient includes platinum and palladium, and a proportion of rhodium to a total amount of rhodium, platinum and palladium represented by a formula, (rhodium amount)/(rhodium amount+platinum amount+palladium amount), accounts for 20 wt % or more.

4. The exhaust gas purifying system of claim 2, wherein the catalytic ingredient includes platinum and palladium, and platinum and palladium are loaded on an inner layer other than the outermost layer.

5. The exhaust gas purifying system of claim 2, wherein the exhaust gas purifying catalyst is located at a point in the exhaust gas system at which a temperature at an inlet of the exhaust gas purifying catalyst in the lean condition of the exhaust gas is at least about 200° C.

6. The exhaust gas purifying system of claim 2, wherein the carbon monoxide reduction catalyst reduces carbon monoxide in a stoichiometric or rich condition of exhaust gas.

7. The exhaust gas purifying system of claim 6, wherein an amount of carbon monoxide which flows into the exhaust gas purifying catalyst in the stoichiometric or rich condition is within a range from 0.5 to 3.0 wt %.

8. The exhaust gas purifying system of claim 2, wherein the exhaust gas purifying catalyst consists essentially of:

the catalytic ingredient; and the monolithic support.

* * * * *